L. MURPHY.
APPARATUS FOR INDICATING THE DEPTH OF LIQUID IN VESSELS.
APPLICATION FILED JULY 15, 1918.
1,368,187.  Patented Feb. 8, 1921.
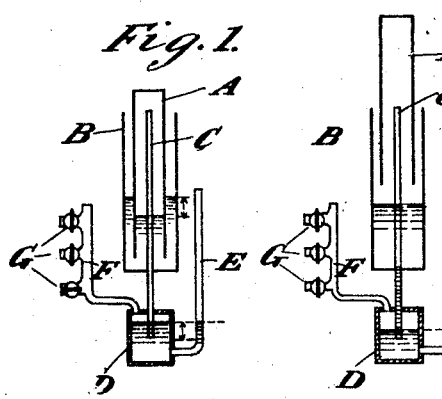
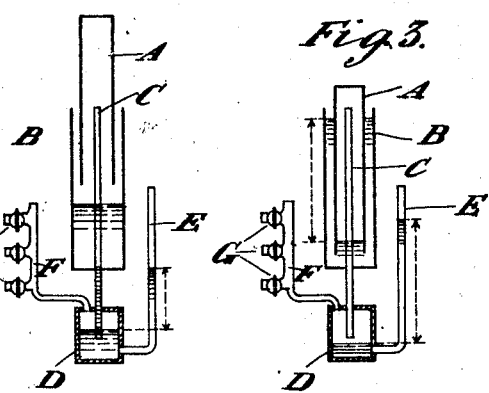
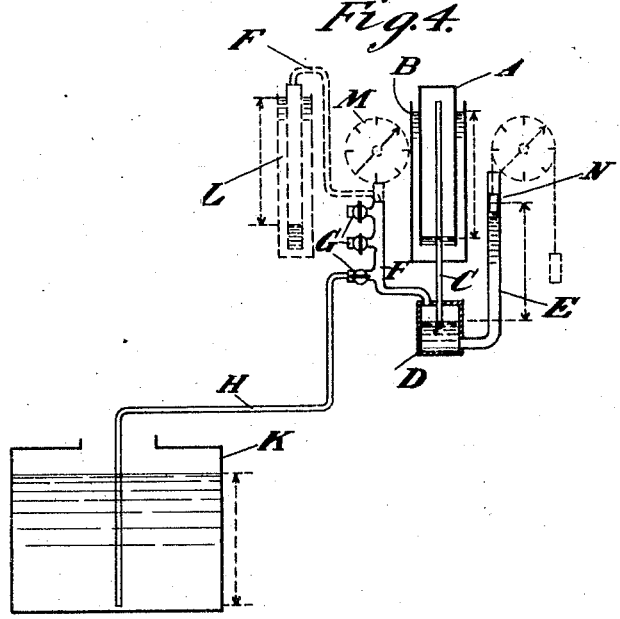

UNITED STATES PATENT OFFICE.

LEONARD MURPHY, OF DUBLIN, IRELAND.

APPARATUS FOR INDICATING THE DEPTH OF LIQUID IN VESSELS.

1,368,187.

Specification of Letters Patent. Patented Feb. 8, 1921.

Application filed July 15, 1918. Serial No. 245,028.

*To all whom it may concern:*

Be it known that I, LEONARD MURPHY, a subject of the King of Great Britain, residing in Dublin, Ireland, have invented certain new and useful Improvements in Apparatus for Indicating the Depth of Liquid in Vessels, of which the following is a specification.

In Letters Patent No. 867994 of 1907 I have described an apparatus for indicating the depth of liquid in a tank or other receptacle by forcing air or other gas into a gage or gage reservoir until the effective pressure on the indicating liquid was that due to the depth of liquid in the vessel to be gaged, the gas being introduced into the gage through a tube dipping into the indicating liquid which automatically sealed the apparatus against leakage of the gas, any excess gas escaping through the open end of the line tube which reached to the bottom of the vessel to be gaged.

In one form of the apparatus the indicating parts of the instrument were separated from the sealing chamber, so that no evaporation of the indicating liquid could occur when air or other gas was forced through it. The air was forced by the compressor through a tube dipping below the surface of mercury and escaped by a pipe leading to the indicator and to the line tube. In this construction the possibility occurs that, if the line tube is inadvertently closed, the air pressure may exceed the capacity of the indicating column of liquid, which would in consequence be forced out, or a spring pressure gage might be seriously strained.

According to the present invention, this danger is obviated by a device by which the liquid in the sealing chamber ceases to act as a seal when a predetermined pressure is reached. For this purpose a vertical safety tube open at the upper end is connected at its lower end with the liquid in the seal chamber and the cross sections of the tube and the chamber are so proportioned, that when the air pressure reaches a predetermined value sufficient liquid has passed from the seal chamber into the safety tube to uncover the end of the tube which supplies the air pressure and normally dips below the surface of the liquid. When the end of the tube is uncovered the compressed air flows back into the compressor after each stroke.

In the accompanying drawings Figures 1–3 show the action of a device according to the invention respectively, in three stages of the process.

Fig. 4 shows a measuring instrument according to the invention with various forms of indicating apparatus.

In the examples shown the air pressure is provided by a cylindrical tube A closed at the upper end, the lower end dipping into a liquid contained in the vessel B. A compressor tube C having its upper open end extending to the upper end of the vessel B has its lower end extending into a sealing chamber D, so that the liquid in the sealing chamber D (mercury, for example) normally closes the lower end of said tube. The air pressure generated at each downward stroke of the tube A is conveyed by the tube C to the sealing chamber D. A safety tube E open at the upper end communicates as shown with the lower portion of the sealing chamber. The air pressure is conveyed by a pipe F to cocks G connected respectively by pipes H with the vessels K (see Fig. 4), the depth of liquid in which is to be gaged.

Fig. 1 shows the normal condition of the apparatus when ready to be connected with a vessel.

Fig. 2 shows the apparatus when the measuring process has commenced and some of the liquid from the sealing chamber D has been forced into the safety tube E. It is assumed that all the cocks G have been inadvertently closed.

Fig. 3 shows the condition of the apparatus when the air pressure developed by the downward strokes of the tube A and which has passed through the tube C into the sealing chamber D has overcome the head of the liquid in the latter chamber and been added to the air already in the latter chamber so as to force sufficient liquid from the chamber D into the tube E to uncover the lower end of the tube C. No more air can be trapped by the sealing liquid, since when the tube A is raised, air will flow back through the tube C into the tube A above the liquid in the vessel B, thus reducing the pressure in the sealing chamber D until sufficient liquid flows back from the tube E to the sealing chamber D to cover and close the lower end of the tube C, and at each further stroke of the tube A the air merely flows to and from the compressor without permanently increasing the pressure.

The device is independent of the particular form of compressor used, the tube A shown in the figures representing one form by way of example.

Fig. 4 shows the apparatus under normal conditions connected with a receptacle K; the depth of the liquid in K can be obtained in known manner from a liquid indicator L, or from a spring pressure gage M, connected with the pipe F, or directly from the compressor apparatus A, B if the latter is transparent, or the safety tube E can, as indicated, be used as a gage.

A float N may be provided in the safety tube E to act in known manner as an indicator.

Having thus described the nature of the said invention and the best means I know of carrying the same into practical effect, I claim:—

1. In apparatus for indicating the depth of liquid in a tank or other receptacle, a chamber containing a sealing liquid, a reciprocating compressor element, means for conveying the pressure generated by the working stroke of the compressor element to said chamber, said means being normally sealed at its lower end by the liquid in said chamber, a safety tube open to the atmosphere at its upper end and having its lower end connected with the lower portion of said chamber, the cross-sections of the safety tube and of the chamber being so proportioned that when the air pressure in the chamber reaches a predetermined value the lower end of said means is unsealed to permit the back flow of the air pressure to said compressor element on the back stroke of the latter.

2. An apparatus for indicating the depth of liquid in a tank or other receptacle, comprising a closed chamber containing a sealing liquid, a pipe connected at one end to the upper portion of said chamber and having its other end adapted to be immersed in a tank wherein the depth of liquid is to be measured, a safety tube having its lower end connected to the lower portion of said chamber and its upper end open to the atmosphere, a reciprocating compressor element, means for conveying pressure generated by the working stroke of said compressor element to said chamber, said means being normally sealed by the liquid in said chamber, the cross-sections of said safety tube and said chamber being so proportioned that, when the pressure in said chamber reaches a predetermined value, said means is unsealed to permit the backflow of the air pressure in said chamber to said compressor element on the back stroke of the latter, and means for indicating the level of the liquid in the safety tube to show the depth of liquid in the tank.

In testimony whereof I have signed my name to this specification in the presence of two subscribing witnesses.

LEONARD MURPHY.

Witnesses:
W. E. JOHNSTONE,
C. C. BUOY.